United States Patent
Esslinger et al.

[11] Patent Number: 6,137,076
[45] Date of Patent: Oct. 24, 2000

[54] AUTOMATED WELDING DEVICE FOR THE BUILDUP OF MATERIAL

[75] Inventors: Thomas Esslinger, Alstead; Erik Esslinger, Charlestown, both of N.H.

[73] Assignee: Bore Repair Systems, Inc., Alstead, N.H.

[21] Appl. No.: 09/305,786

[22] Filed: May 4, 1999

[51] Int. Cl.$^7$ .............................. B23K 9/04; B23K 9/12
[52] U.S. Cl. ................... 219/76.14; 219/125.11
[58] Field of Search .............................. 219/76.14, 76.1, 219/125.11; 228/18

[56] References Cited

U.S. PATENT DOCUMENTS

| | | | |
|---|---|---|---|
| 4,527,039 | 7/1985 | Fuwesi | 219/76.14 |
| 4,687,899 | 8/1987 | Acheson | 219/76.14 |
| 4,805,826 | 2/1989 | Moriki | 228/18 |
| 4,851,639 | 7/1989 | Sugitani | 219/125.11 |
| 4,873,419 | 10/1989 | Acheson | 219/125.1 |
| 4,892,990 | 1/1990 | Acheson | 219/76.14 |
| 4,952,769 | 8/1990 | Acheson | 219/76.14 |
| 5,298,710 | 3/1994 | Acheson et al. | 219/76.14 |

*Primary Examiner*—Patrick Ryan
*Assistant Examiner*—Anjan Dey
*Attorney, Agent, or Firm*—Davis and Bujold

[57] ABSTRACT

A welding material supply mechanism for providing a welding bead on a surface comprising: a first hollow arm, a transfer tube, a second hollow arm, swivel bearing and a welding nozzle. The first hollow arm is connected to the second hollow arm by a swivel bearing, and a remote end of the second hollow arm supports a nozzle for facilitating welding on a surface. The swivel bearing facilitates pivoting movement of the second hollow arm relative to the first hollow arm to adjust a diameter of the welding bead to be formed on the surface, and a locking coupler facilitates locking the pivoted and adjusted position of the first hollow arm relative to the second hollow arm. The transfer tube is at least partially received within the first hollow arm and is concentric therewith. The transfer tube supports a female electrical connector coupled to the swivel bearing, the transfer tube establishes a welding electrical current path to the nozzle via the swivel bearing and the second hollow arm. A wire conductor is located within the transfer tube for supplying a welding wire to the nozzle, via the swivel bearing and the second hollow arm. A welding gas flow path is defined between an exterior surface of the wire conductor and an inwardly facing surface of the transfer tube to supply a welding gas to the nozzle via the swivel bearing and the second arm.

13 Claims, 8 Drawing Sheets

AUTOMATED WELDING DEVICE FOR THE BUILDUP OF MATERIAL

BACKGROUND OF THE INVENTION

A wide variety of machinery exists in working conditions throughout the world which is exposed to abrasive and stressful conditions. Large work loads, open and corrosive conditions and time all work to wear out bearing surfaces and require replacement and/or repair. For large bearing surfaces, there is often a need to buildup material in the inner surface of the bearing bore. Various attempts have been made to provide automated machinery for depositing welding beads in a uniform manner on the inner bores of bearing journals.

For instance, U.S. Pat. No. 4,527,039 to Fuwesi teaches an apparatus and method for restoring blind or through surfaces of metallic work pieces. Fuwesi teaches a method by which tools, including welding torches, can be connected to a rotating spindle. The effective radii of rotational movement of the welding torch in Fuwesi is fixed by a combination of the length of the welding attachment itself and the spindle mechanism. Fuwesi does not disclose a manually adjustable axial positioning mechanism.

U.S. Pat. No. 4,687,899 issued to Acheson teaches an apparatus for restoring the inner surfaces of bores in metallic work pieces that has an adjustment means that relies on fixed pieces connected with a gear mechanism for adjusting the effective radii of the welding torch. This mechanism will be either quite large or will have a small range of adjustable radii. As another embodiment of Acheson's apparatus, there is a provided a two part mechanism for adjusting the radius of the welding arm, a radial arm and an arm parallel to the axis of rotation of the axis of the apparatus. It is clear that Acheson requires several embodiments of the device in order to provide a wide range of radii.

U.S. Pat. No. 5,298,710 issued to Acheson also teaches an apparatus for building up material in a large bore of a metallic work piece. In developing the Acheson technology of previous patents, including U.S. Pat. Nos. 4,873,419; 4,892,990; and 4,952,769; Acheson has relied upon additional setups to provide a greater radii range and about 360 degrees of rotation and then makes an axial step, effectively equal to a width of the welding bead.

The typical trend has been to make devices that are capable of doing many operations, including building up bore surfaces and little attention has been paid to providing equipment that is responsive to the needs and conditions imposed by day to day operations. However, none of the prior art references are specifically configured to be easy to set up in the field, which typically is their primary working condition. Each of the known systems is complicated and requires careful attention to setup parameters in order to insure proper operation. The present invention is designed to allow easy setup and use through means of easy adjustment of the apparatus, manual adjustment of the significant positioning parameters, simple linear controls to adjust process parameters of the buildup process, and, relatively small size.

It is an object of the invention to provide a device for uniformly building up the inner surface of a bore and which is easy to setup.

It is a further object of the invention to provide an apparatus that provides a very uniform buildup of material on the inner surface of a bore.

It is also an object of the invention to provide an apparatus for the buildup of material that is easy to position and reposition or to change the direction of the movement of the apparatus along an axis.

It is also an object of the invention to provide an apparatus that will create a spiral buildup mechanism, simple manual axial adjustment, and simple manual radial adjustment.

Furthermore, it is an object of the invention to provide linear adjustment of a buildup rate and a sweep rate of the apparatus during operation.

SUMMARY OF THE INVENTION

The present invention relates to an automated welding device used to build up material on the inner surface of a bore so that the bore can be restored to its original working order. The apparatus is characterized in having various improvements over the state of the art devices specifically including a welding extension arm that has a first and second hollow arm joined with a swivel bearing that allows radial adjustment of a welding torch nozzle that extends from the second hollow arm; a unitary mechanical mechanism that coordinates the rotation of the welding arm and the axial movement of the welding torch; a manually releasable mechanism for adjusting the initial radial position of the welding arm and readjustment of the same; and a conductive path that provides current flow in an external portion of the device is limited to the swivel bearing and the second hollow arm of the welding torch arm. Furthermore, the welding core assembly which carries the welding component.

DETAILED DESCRIPTION OF THE INVENTION

The present invention relates to an apparatus for providing a uniform welding bead on the interior surface of a circular bore comprising: a first hollow arm rotatable along a radial axis; a swivel bearing means attached at a first point to the first hollow arm aligned on said radial axis; and a second hollow arm attached to a second point of said swivel bearing means so as to be disposed away from said radial axis. This simple arrangement allows an operator in the field to adjust the mechanism to work in bores of varying radii.

Figure 1:
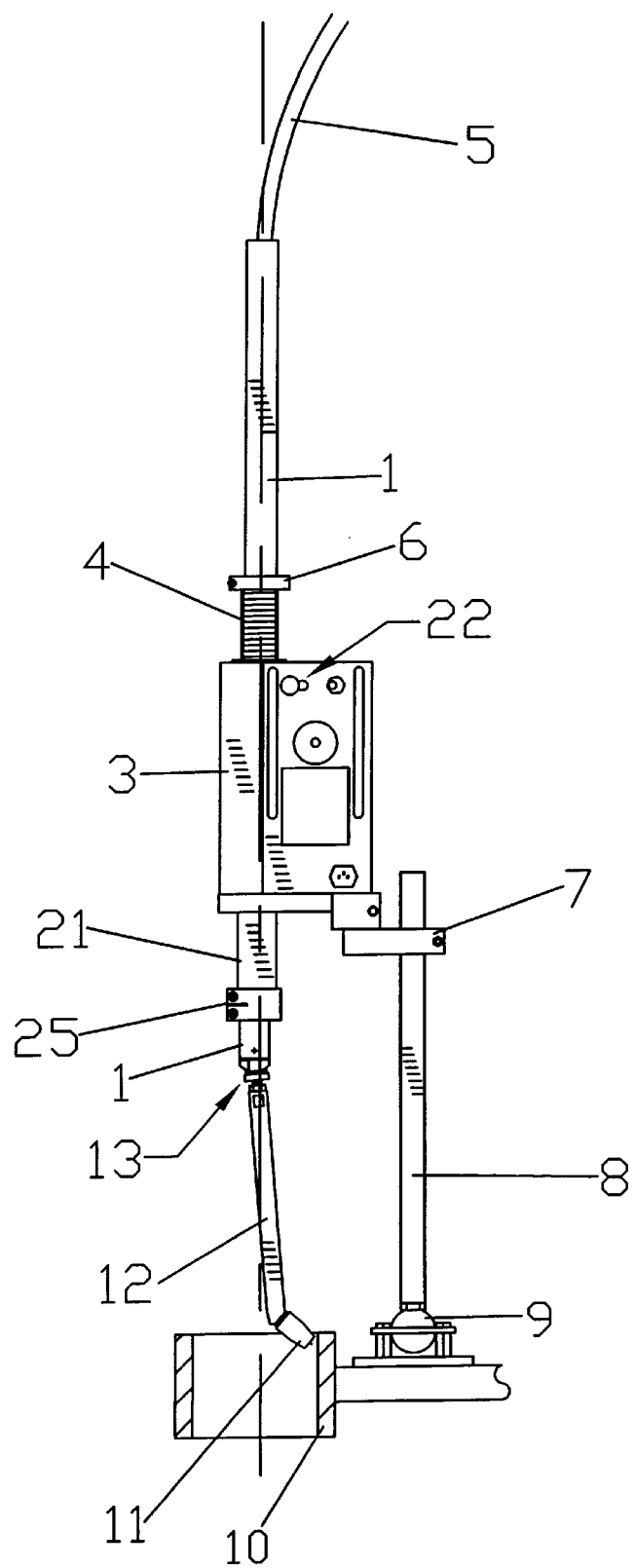
FIG. 1 is a partial perspective view of one embodiment of the present invention.

As can be seen in FIG. 1, the operator will align the axis of the first hollow arm 1 along the desired axis of the bore 10 placing the nozzle 11 of the welding torch at a starting point of the bore where welding material is to be deposited or built up. Adjustment of the effective radii of the apparatus is achieved by swinging the second hollow arm 12, via the swivel bearing means 13, and positioning the nozzle 11 of the welding torch in working proximity to the bore surface.

The apparatus can be conveniently aligned with the bore 10 by fixing the clamping means 9 to a desired fixed surface and then adjusting the adjustable support bracket means 7 to a desired adjusted position along the length of the mounting rod 8. Once fixed, the clutch control mechanism 22, in FIGS. 3, 7 and 8, can release the welding carrier mechanism so that it is freely moved to a desired position.

The clutch control mechanism 22 engages a threaded guide 4, on an exterior surface of the spindle 21, that controls the axial movement of the welding mechanism as the welding mechanism is rotated about its axis. Clearly, the rate of axial movement depends upon the size of the thread of said threaded guide 4. Those skilled in the art would find it straightforward to adjust the thread size for particular welding operations. In the practice of the present invention, the screw thread ranges from six to ten turns per inch, although preferably there are seven to eight screw threads per inch. The invention may be practiced with screw dimensions outside this range as conditions might require.

Figure 3:
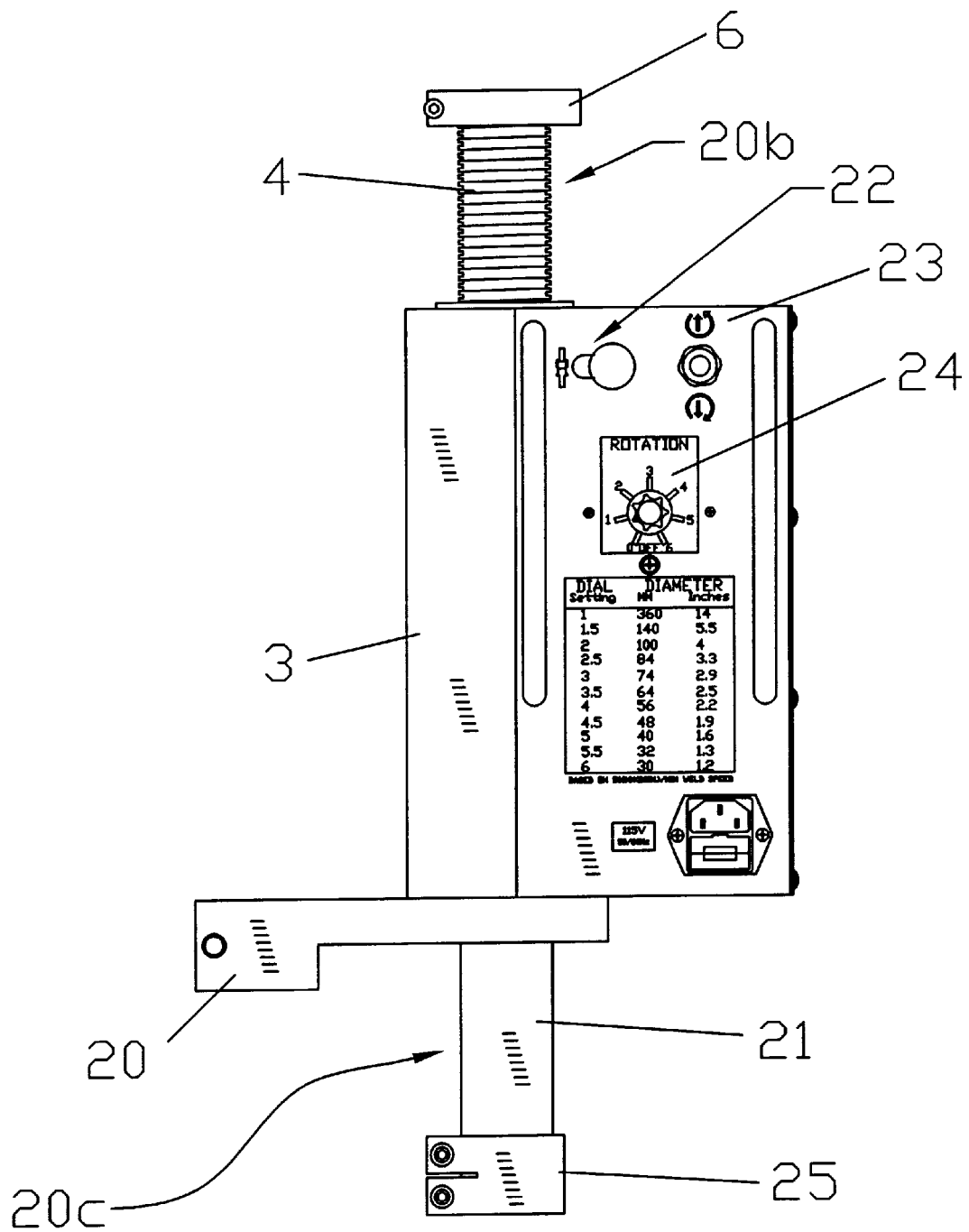
FIG. 3 is a partial perspective view of the rotation control apparatus placement means of one embodiment of the present invention.

As shown in FIG. 3, the housing 3 for the control unit surrounds the spindle 21 and the spindle 21 extends through the control unit and carries the welding material carrier mechanism. The housing 3 supports the clutch control mechanism 22 attached to the clutch means, a rotational speed control 24 attached to the control mechanism in the controller and a directional controller 23 for causing the spindle 21 to rotate in either a forward or a reverse direction. The spindle 21 has a screw mechanism portion 20b, and a portion at the opposite side of the controller 20c. There may be disposed at opposing ends of the spindle 21, a first clamping or positioning means 6 and a second clamp 25 that also provides an indication of the position of the spindle 21.

Figure 2:
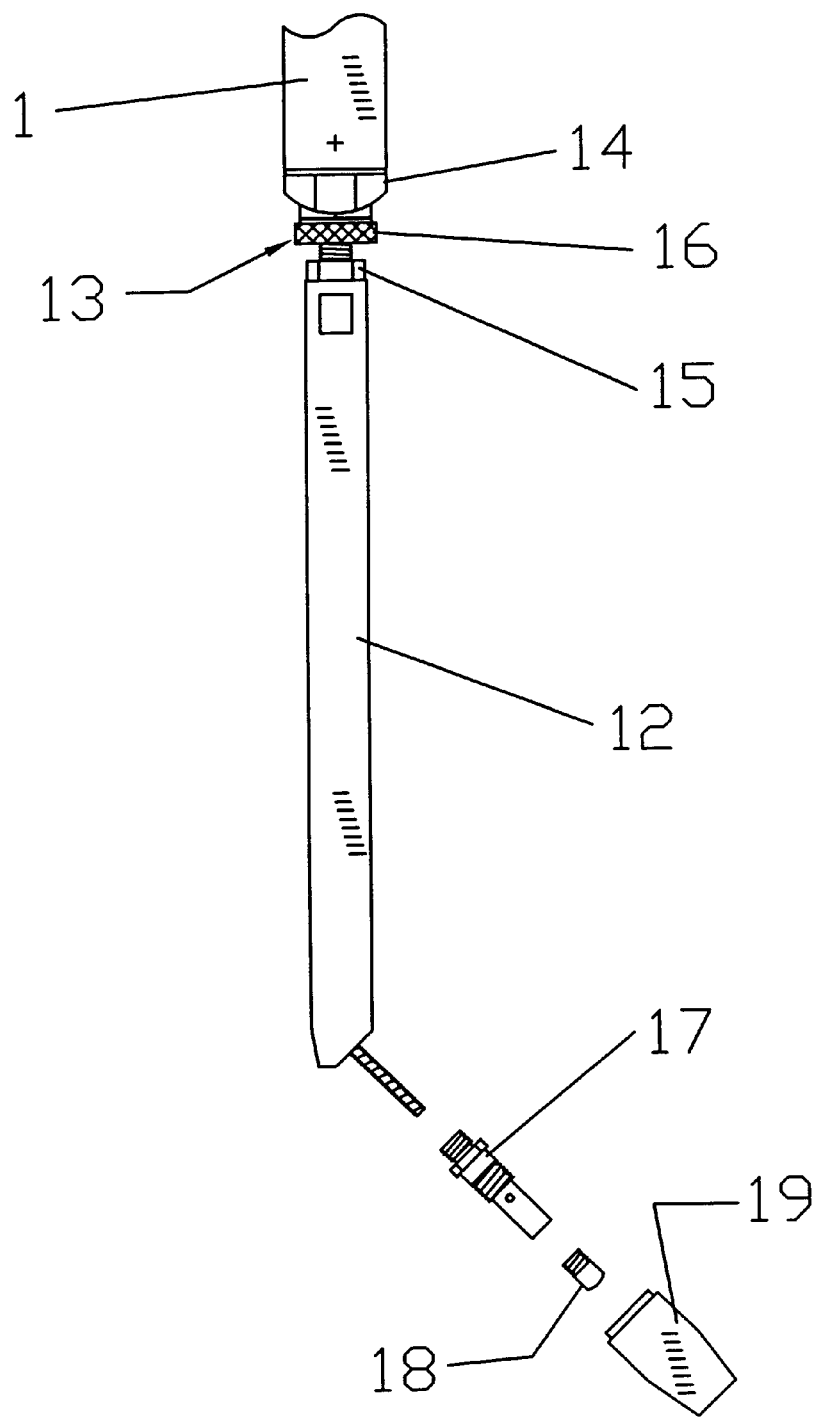
FIG. 2 is a partial perspective view of the lower axial displacement means of one embodiment of the present invention.
Figure 4:
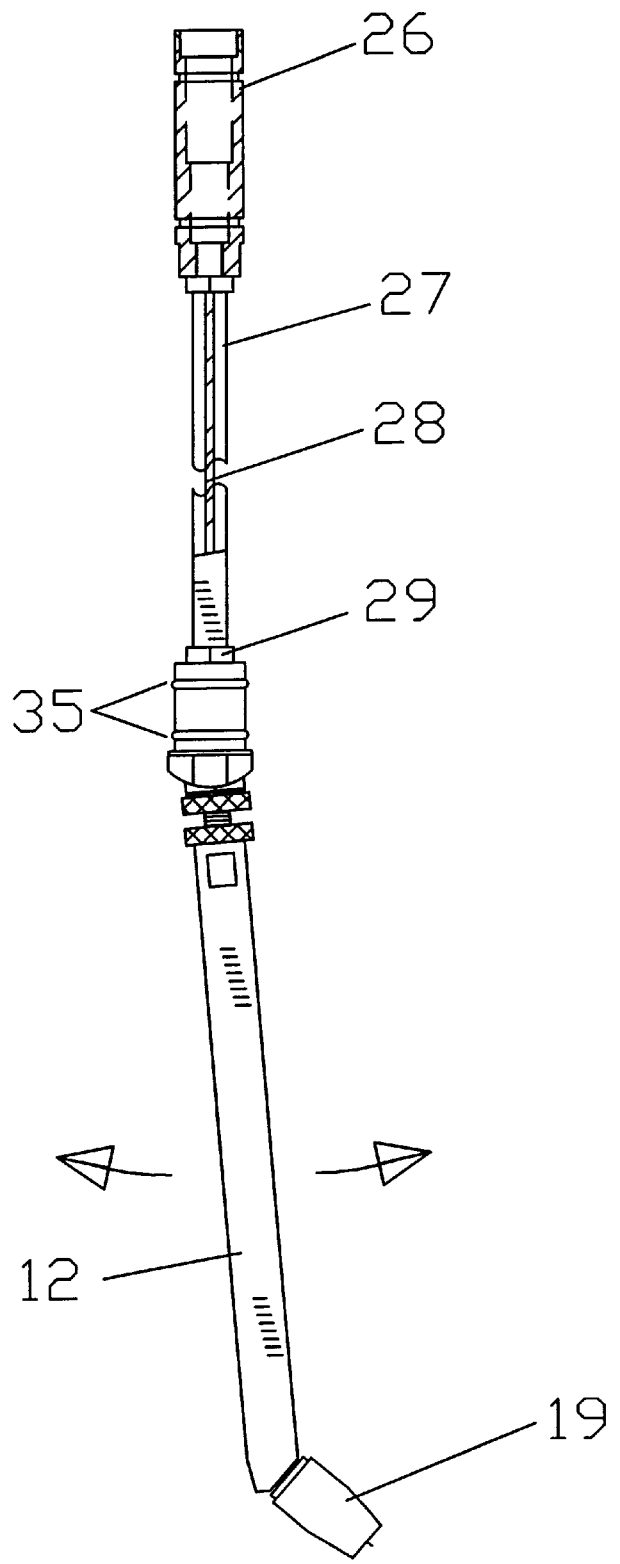
FIG. 4 is a partial cross sectional view of the swivel control placement means and lower portion of the welding material supply mechanism of the present invention.

The welding material supply mechanism comprises a welding wire guide liner; a welding current path; and a welding gas path or conduit. FIGS. 2 and 4 shows the second arm 12 attached to the swivel bearing means 13 and the hollow first arm 1. A welding wire guide passes through the first hollow arm 1, the swivel bearing means 13 and the second arm 12 and through a gas diffuser 17 to a welding tip 18 and finally through the welding nozzle 19. The welding current runs through the wall of a transfer tube 27, and the swivel bearing means 13 and the second hollow arm 12 to the welding tip. Gas is supplied through the transfer tube 27 and the second hollow arms 12 to the gas diffuser 17.

The first and second hollow arms 1 and 12 are attached to the swivel bearing and a locking coupler 16 is tightened when these components are in the desired position. The transfer tube 27 runs through the first hollow arm 1 of the apparatus, and is electrically insulated from the first hollow arm 1.

Figure 5:
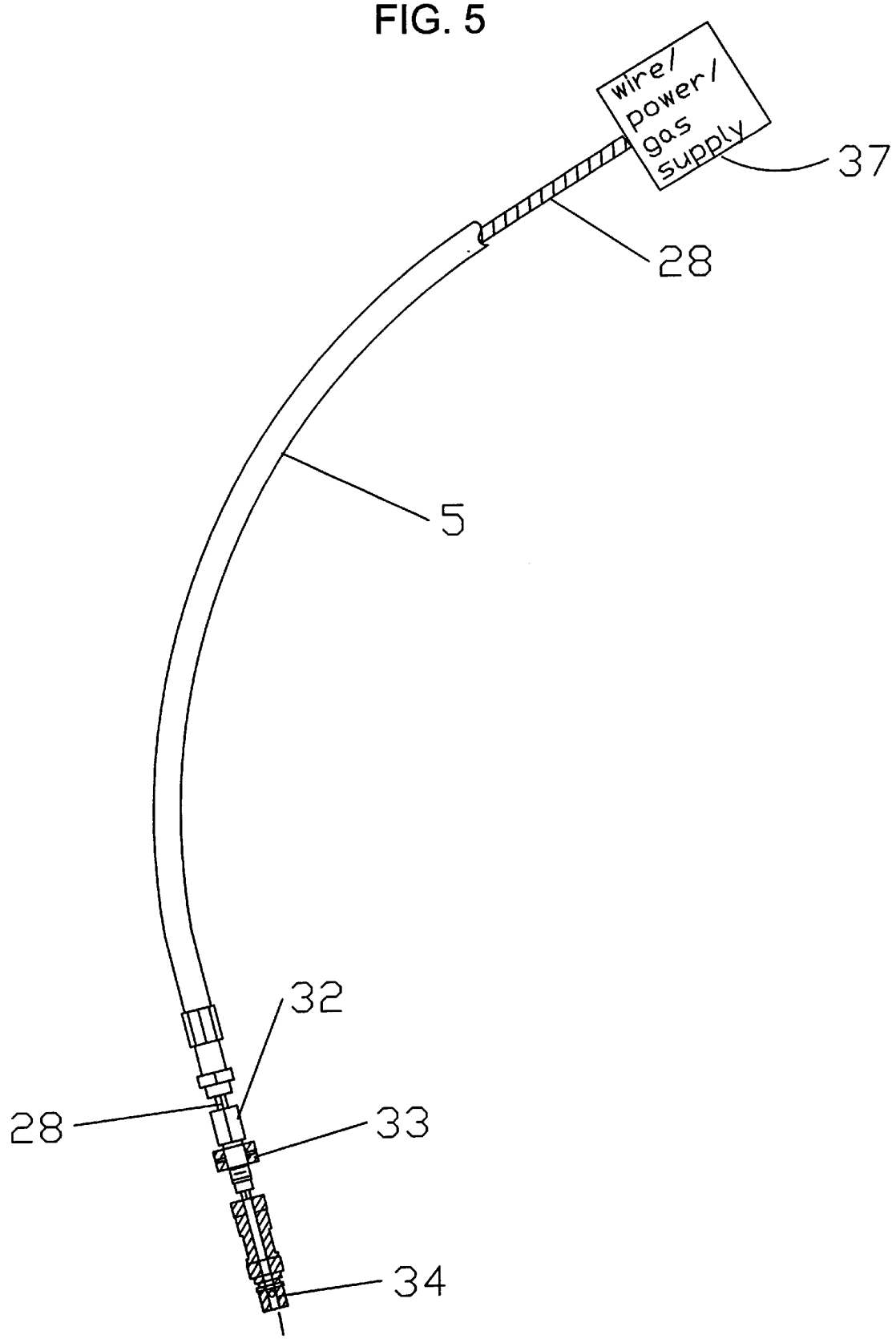
FIG. 5 is a partial cross sectional view of the conduit assembly of the present invention.

FIGS. 4 and 5 show the rotating portion of the welding core including the female electrical conductor 26, the hollow first arm wall (transfer tube) 27, the flexible wire conductor 28 and a locking nut 29 for attaching the transfer tube 27 to the swivel bearing 13. This mechanism is carried within the first hollow arm 1 that runs through the spindle 21 to the swivel bearing means 13. It is the swivel bearing 13 that the welding potential runs through an exterior portion of the apparatus, through the second hollow arm 12, the gas diffuser 17 and the tip of the welding torch.

FIG. 5 shows wire/power/gas feed conduit 5 with the wire guide liner 28 attached to an adapter 32, a retainer ring 33 and a stationary current transfer connecter (or male electrical connector) 34. It is important to note that the current path in the present invention does not follow an exterior surface of the apparatus until the current path reaches the swivel bearing 13. The welding core is supported within the spindle 21, by the first hollow arm 1, and the welding core is isolated from the extension tube by a plurality of O-rings 35 (FIG. 4).

During operation, the apparatus of the present invention may be easily setup, by first positioning the apparatus along the axis of the bore to be rebuilt. This is accomplished by any number of methods. In one method, the work piece is fixed to a stationary object and the axis of the apparatus is aligned with the bore. This may be accomplished initially by sight and then further adjusted once the apparatus is setup by adjusting the ball joint anchor and the adjustable brackets. In many instances, the work piece will include more than one bore that needs to be refurbished. In many instances, such as with construction equipment, there will be at least two bores that share a common axis. Alignment can be accomplished by use of a rod with two opposing conical slidable attachments (a first and second slidable conical attachments). The first cone is placed into the first bore and the second cone is slide along the rod into the second bore. A portion of the rod passes through the hollow spindle of the apparatus to allow fixing of the apparatus to both bore axes.

The effective radius of the welding core is then adjusted by adjusting the nozzle of the welding torch to an optimal working distance by swiveling the torch (the nozzle and the second hollow arm 12) of the welding core via the swivel bearing means 13 to a desired radial position.

During operation, after the apparatus has been aligned along the axis of the bore 10 and the welding torch has been adjusted for its radius and initial starting position by engaging the spindle 21 at a correct axial position and swinging the welding torch into its working position by pivoting via the swivel bearing 13, the apparatus starts operation. The spindle 21 is rotated about its axis and welding materials (welding current, welding wire and welding gas) are supplied through the welding core to the welding torch which then deposits a strip of metal on the inner bore surface as the torch rotates around the inner circumference of the bore. Because the spindle's axial position is a function of the clutch mechanism's contact with the threaded screw portion 4 of the spindle 21, as the spindle 21 rotates the axial position of the spindle changes. The screw thread density determines the number of spirals per inch that the torch moves, and a spiral pattern of welded material is built up on the inner bore surface. Once the desired portion of the bore is built up, the apparatus is shut off. Clearly, the bore can also be built up with several layers by repeating the above process.

The removable welding core of the present invention, shown in FIG. 4 and FIG. 5, is comprised of the transfer tube 27 rotatable along an axis; a swivel bearing means 13 attached at a first end to the transfer tube 27 aligned on said axis; and the second hollow arm 12 attached to a second end of said swivel bearing means 13 so as to be disposed away from said axis where said transfer tube 27 attaches to a rotatable electrical connector comprising a first female portion and a second male portion wherein the electrical contact is formed between an outer radial surface of said male portion and an inner surface of said female portion and the male portion is connected to flexible conduit that carries the welding wire and the welding wire conduit, a conduit to transport the welding gas mixture and an electrical conductor from a wire/power/gas supply 37, only diagrammatically shown. This welding core is insertable and removable from the control and rotation controller; this controller comprises a hollow spindle; a drive mechanism for rotating the hollow spindle; and fixing means for holding the welding core.

Specifically the controller further comprises a manual clutch mechanism for allowing slidable adjustment along the axis of rotation and a screw mechanism that coordinates the axial and radial movement of the spindle 21. The spindle 21 may be connected to the welding core via electrically insulated means in order to isolate the spindle 21 from the electrical current and minimize the exposure of welding current to the lower portion of the welding core.

Figure 6:
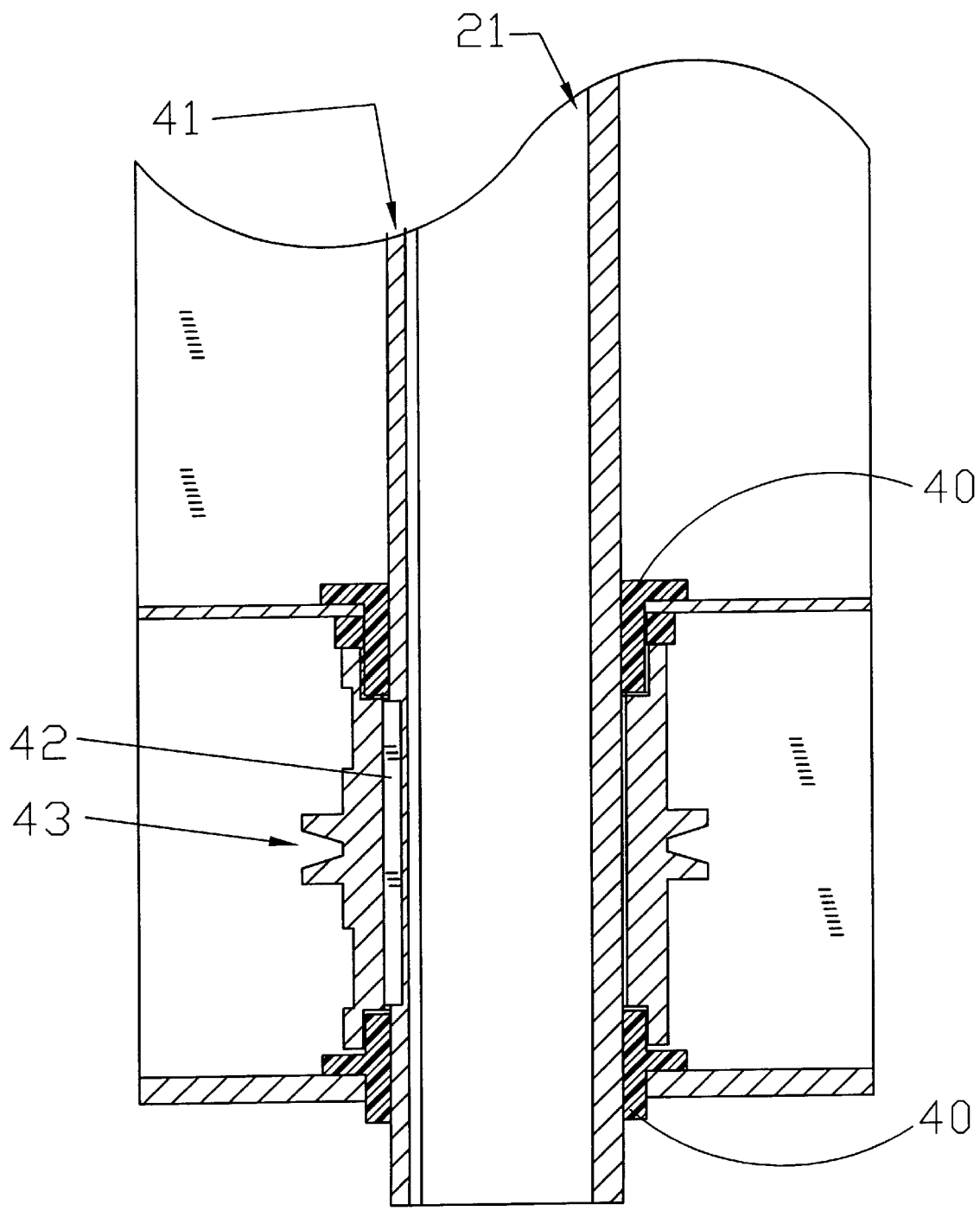
FIG. 6 is a partial cross sectional view of the hollow spindle assembly.

FIG. 6 shows the spindle assembly which is comprised of the spindle 21, a key way 41 disposed along the exterior surface of the spindle 21, a key 42 disposed in said key way 41, a spindle drive pulley 43 coupled to said key 42 and positioning means. A drive V-belt 51 wraps around the spindle drive pulley 43 as well as the motor pulley 52 driven by a motor M (see FIG. 7).

Figure 7:
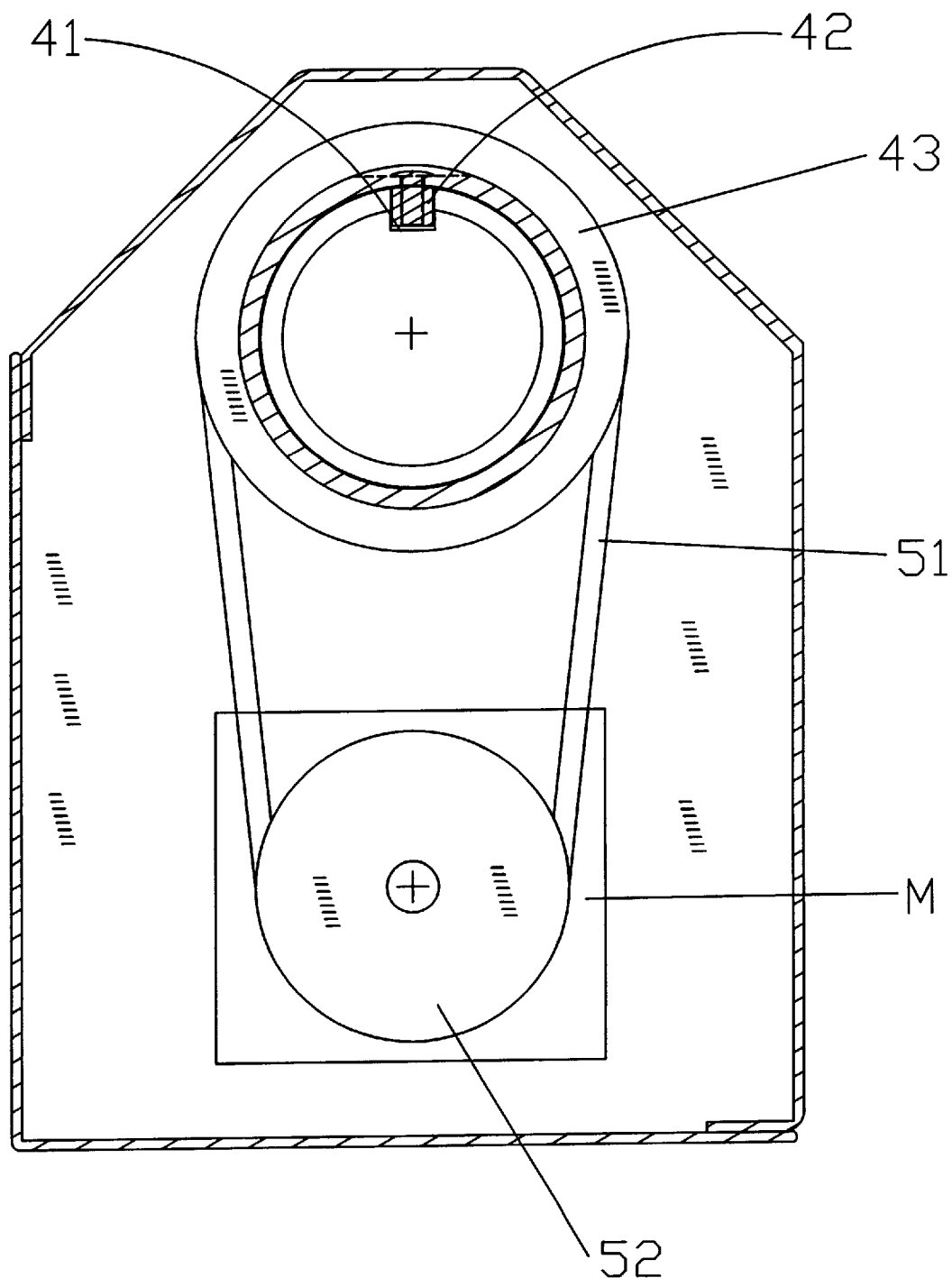
FIG. 7 is a horizontal plan showing the spindle and its rotation drive mechanism.

FIG. 7 shows a cross-section of the motor-pulley 52, the V-belt 51 and spindle drive pulley 43. This Figure also shows the spindle 21, with the key 42 and the key way 41 with a spindle bushing 40 (FIG. 6) disposed between spindle 21 and the spindle drive pulley 43.

Figures 8A, 8B:
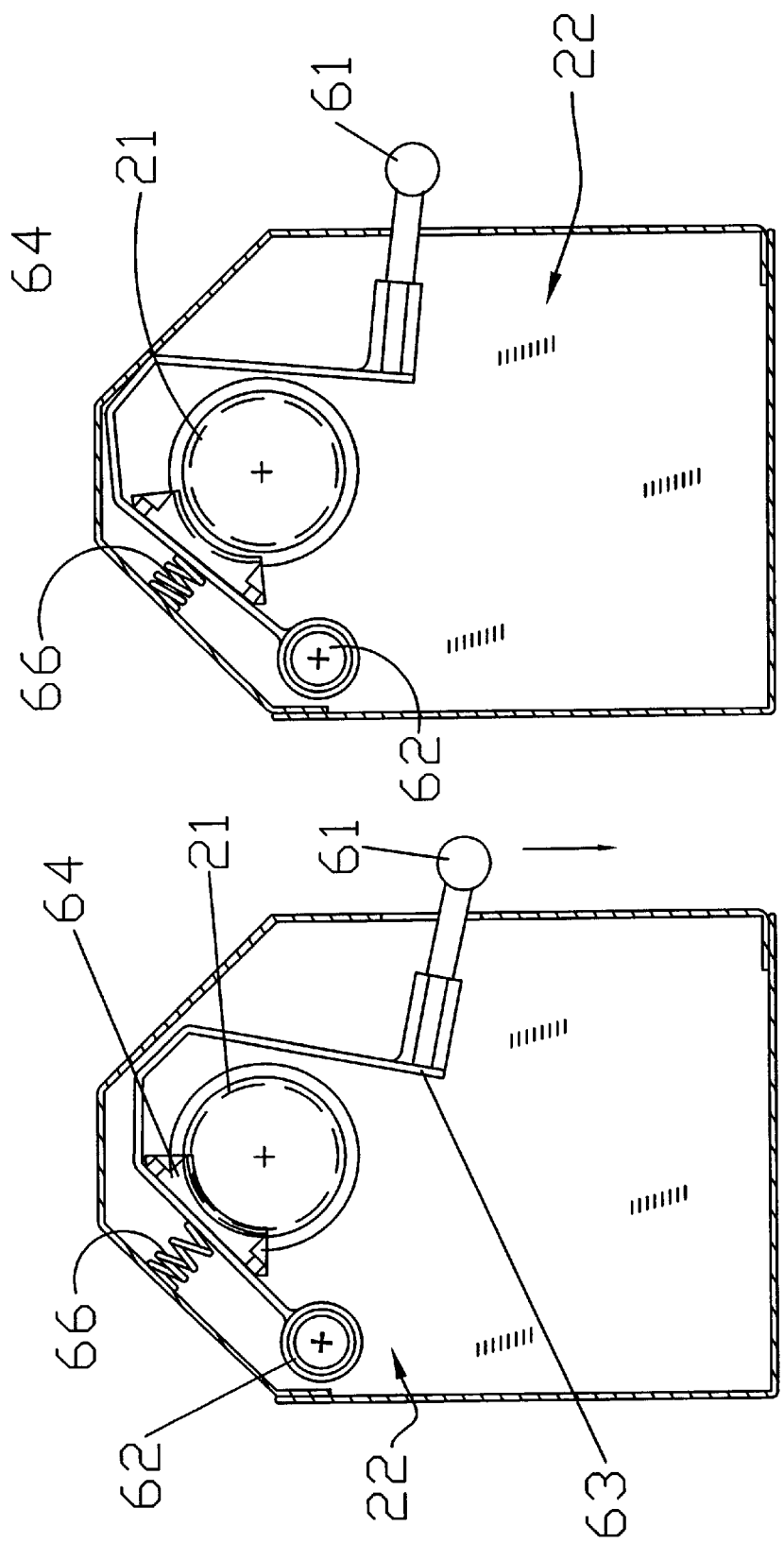
FIG. 8A is a diagrammatic horizontal plan of the spindle and the clutch mechanism showing a clutched engaged position.
FIG. 8B is a diagrammatic horizontal plan of the spindle and the clutch mechanism showing a clutched disengaged position.

FIGS. 8A and 8B shows a horizontal cross-section of the control box or housing and illustrates operation of the clutch control mechanism 22. As can be seen in these Figures, a clutch control knob 61, is connected to a clutch pivot point 62 via a clutch arm 63 that is tensioned through a tensioning means pressing a threaded nut section 64 against the threaded exterior portion 4 of the spindle 21. As shown in these Figures, the tensioning means is a simple spring 66. In FIG. 8A, the nut section 64 engages with the threaded exterior portion 4 of the spindle 21 and in FIG. 8B the clutch disengages the nut section 64 from the threaded exterior portion 4 of the spindle 21.

Thus, the apparatus of the present invention allows a very uniform volume of welding material to be deposited on the inner surface of a cylindrical bore by employing the device with a state of the art Mig welding apparatus. The apparatus need not limited to any particular form of welding and those skilled in the art of welding would be able to adapt the specific embodiments disclosed herein to other welding techniques.

What is claimed is:

1. A welding material supply mechanism for providing a welding bead on a surface, the welding material supply mechanism comprising:

a first hollow arm being connected to a second hollow arm by a swivel bearing, and a remote end of the second hollow arm supporting a nozzle surrounding a welding tip for facilitating welding on a surface such that the swivel bearing facilitates pivoting movement of the second hollow arm relative to the first hollow arm to adjust a diameter of the welding bead to be formed on the surface, and a locking coupler facilitates locking the pivoted and adjusted position of the second hollow arm relative to the first hollow arm;

a transfer tube being at least partially received within the first hollow arm and being concentric therewith, one end of the transfer tube is attached to a female electrical connector and the other end of the transfer tube is attached to the swivel bearing, the transfer tube establishes a welding electrical current path to the nozzle via the swivel bearing and the second hollow arm; a wire conductor being located within the transfer tube for supplying a welding wire to the nozzle, via the swivel bearing and the second hollow arm; and a welding gas flow path being defined between an exterior surface of the wire conductor and an inwardly facing surface of the transfer tube to supply a welding gas to the nozzle via the swivel bearing and the second arm.

2. The welding material supply mechanism for providing a welding bead according to claim 1, wherein a first end of a conduit is received within the first hollow arm, the conduit contains a wire guide for supplying a welding wire, a gas supply conduit for supplying a welding gas and an electrical path for supplying welding electricity, and the first end of the conduit has a mating male electrical connector for engagement with the female electrical connector of the first hollow arm, and once the female and male electrical connectors are engaged with one another, the wire guide of the conduit is aligned with the wire guide of the first hollow arm to facilitate conveying the welding wire to the nozzle, the gas conduit of the conduit is aligned with the gas conduit of the transfer tube to facilitate conveying the welding gas to the nozzle, and the electrical path of the conduit is coupled to the electrical path of the transfer tube to facilitate conveying welding electricity to the nozzle.

3. The welding material supply mechanism for providing a welding bead according to claim 2, wherein a second end of the conduit is provided with a coupling for connecting the conduit to a supply of welding gas to the nozzle, to an electrical supply for supplying a welding electricity to the nozzle and a supply of welding wire for supplying welding wire to the nozzle.

4. The welding material supply mechanism for providing a welding bead according to claim 2, wherein the conduit and the mating male electrical connector remain stationary, during operation of the welding material supply mechanism, while the female electrical connector and the first hollow arm rotate with the spindle when the spindle is driven by the drive.

5. The welding material supply mechanism for providing a welding bead according to claim 1, wherein the transfer tube and the second hollow arm are sufficiently hollow to supply a welding wire and a welding gas to the nozzle and the transfer tube, the swivel bearing and the second hollow arm are sufficiently electrically conductive to supply a welding current to the welding tip to facilitate welding of a desired surface.

6. The welding material supply mechanism for providing a welding bead according to claim 1, wherein the first hollow arm is concentric with the transfer tube supporting the female electrical connector, and the first hollow arm is electrically isolated from the transfer tube by O-rings.

7. The welding material supply mechanism for providing a welding bead according to claim 1, wherein the first hollow arm and the transfer tube are substantially cylindrical members to facilitate receiving the welding material supply mechanism for providing a welding bead within a cylindrical spindle to facilitate rotation thereof.

8. A welding material supply mechanism for providing a welding bead on a surface, the welding material supply mechanism comprising:

a first hollow arm being connected to a second hollow arm by a swivel bearing, and a remote end of the second hollow arm supporting a nozzle surrounding a welding tip for facilitating welding on a surface such that the swivel bearing facilitates pivoting movement of the second hollow arm relative to the first hollow arm to adjust a diameter of the welding bead to be formed on the surface, and a locking coupler facilitates locking the pivoted and adjusted position of the first hollow arm relative to the second hollow arm;

a transfer tube being at least partially received within the first hollow arm and being concentric therewith, one end of the transfer tube is attached to a female electrical connector and the other end of the transfer tube is attached to the swivel bearing, the transfer tube establishes a welding electrical current path to the nozzle via the swivel bearing and the second hollow arm; a wire conductor being located within the transfer tube for supplying a welding wire to the nozzle, via the swivel bearing and the second hollow arm; and a welding gas flow path being defined between an exterior surface of the wire conductor and an inwardly facing surface of the transfer tube to supply a welding gas to the nozzle via the swivel bearing and the second arm;

the transfer tube and the second hollow arm being sufficiently hollow to supply a welding wire and a welding gas to the nozzle and the transfer tube, and the swivel bearing and the second hollow arm being sufficiently electrically conductive to supply a welding current to the welding tip to facilitate welding of a desired surface; and a first end of a conduit being received within the first hollow arm, the conduit containing a wire guide for supplying a welding wire, a gas supply conduit for supplying a welding gas and an electrical path for supplying welding electricity, and the first end of the conduit having a mating male electrical connector for engagement with the female electrical connector of the first hollow arm, and once the female and male electrical connectors are engaged with one another, the wire guide of the conduit is aligned with the wire guide of the first hollow arm to facilitate conveying the welding wire to the nozzle, the gas conduit of the conduit being aligned with the gas conduit of the transfer tube to facilitate conveying the welding gas to the nozzle, and the electrical path of the conduit being coupled to the electrical path of the transfer tube to facilitate conveying welding electricity to the nozzle.

9. The welding material supply mechanism for providing a welding bead according to claim 8, wherein a second end of the conduit is provided with a coupling for connecting the conduit to a supply of welding gas to the nozzle, to an electrical supply for supplying a welding electricity to the nozzle and a supply of welding wire for supplying welding wire to the nozzle.

10. The welding material supply mechanism for providing a welding bead according to claim 9, wherein the conduit and the mating male electrical connector remain stationary, during operation of the welding material supply mechanism, while the female electrical connector and the first hollow arm rotate with the spindle when the spindle is driven by the drive.

11. The welding material supply mechanism for providing a welding bead according to claim 8, wherein the first hollow arm is concentric with the transfer tube supporting the female electrical connector, and the first hollow arm is electrically isolated from the transfer tube by O-rings.

12. The welding material supply mechanism for providing a welding bead according to claim 8, wherein the first hollow arm and the transfer tube are substantially cylindrical members to facilitate receiving the welding material supply mechanism for providing a welding bead within a cylindrical spindle to facilitate rotation thereof.

13. A welding material supply mechanism for providing a welding bead on a surface, the welding material supply mechanism comprising:

a first hollow arm being connected to a second hollow arm by a swivel bearing, and a remote end of the second hollow arm supporting a nozzle surrounding a welding tip for facilitating welding on a surface such that the swivel bearing facilitates pivoting movement of the second hollow arm relative to the first hollow arm to adjust a diameter of the welding bead to be formed on the surface, and a locking coupler facilitates locking the pivoted and adjusted position of the first hollow arm relative to the second hollow arm;

a transfer tube being at least partially received within the first hollow arm and being concentric therewith, the transfer tube supporting a female electrical connector coupled to the swivel bearing, the transfer tube establishes a welding electrical current path to the nozzle via the swivel bearing and the second hollow arm; a wire conductor being located within the transfer tube for supplying a welding wire to the nozzle, via the swivel bearing and the second hollow arm; and a welding gas flow path being defined between an exterior surface of the wire conductor and an inwardly facing surface of the transfer tube to supply a welding gas to the nozzle via the swivel bearing and the second arm;

the transfer tube and the second hollow arms being sufficiently hollow to supply a welding wire and a welding gas to the nozzle and the transfer tube, and the swivel bearing and the second hollow arm being sufficiently electrically conductive to supply a welding current to the welding tip to facilitate welding of a desired surface;

a first end of a conduit being received within the first hollow arm, the conduit containing a wire guide for supplying a welding wire, a gas supply conduit for supplying a welding gas and an electrical path for supplying welding electricity, and the first end of the conduit having a mating male electrical connector for engagement with the female electrical connector of the first hollow arm, and once the female and male electrical connectors are engaged with one another, the wire guide of the conduit is aligned with the wire guide of the first hollow arm to facilitate conveying the welding wire to the nozzle, the gas conduit of the conduit being aligned with the gas conduit of the transfer tube to facilitate conveying the welding gas to the nozzle, and the electrical path of the conduit being coupled to the electrical path of the transfer tube to facilitate conveying welding electricity to the nozzle;

a second end of the conduit being provided with a coupling for connecting the conduit to a supply of welding gas to the nozzle, to an electrical supply for supplying a welding electricity to the nozzle and a supply of welding wire for supplying welding wire to the nozzle;

the conduit and the mating male electrical connector remaining stationary, during operation of the welding material supply mechanism, while the female electrical connector and the first hollow arm rotate with the spindle when the spindle is driven by the drive; and the first hollow arm being concentric with the transfer tube supporting the female electrical connector, and the first hollow arm being electrically isolated from the transfer tube by O rings.

* * * * *

UNITED STATES PATENT AND TRADEMARK OFFICE
CERTIFICATE OF CORRECTION

PATENT NO. : 6,137,076　　　　　　　　　　　　　　　　　　　Page 1 of 1
DATED       : October 24, 2000
INVENTOR(S) : Thomas Esslinger and Erik Esslinger It is certified that error appears in the above-identified patent and that said Letters Patent is hereby corrected as shown below:

<u>Title page,</u>
Left column, please add:

"Related U.S. Application Data
[62] Division of application No. 09/421,206, filed on Jul. 21, 1998."; and Column 1 of the specification between the "title" and "BACKGROUND OF THE INVENTION" pelase add:
　　　"This is a divisional application of U.S. patent application Ser. No. 09/421,206 filed Jul. 21, 1998."

Signed and Sealed this

Eighteenth Day of December, 2001

Attest:

JAMES E. ROGAN
*Attesting Officer*　　　　　　　*Director of the United States Patent and Trademark Office*

UNITED STATES PATENT AND TRADEMARK OFFICE
CERTIFICATE OF CORRECTION

PATENT NO.    : 6,137,076
DATED         : October 24, 2000
INVENTOR(S)   : Thomas Esslinger and Erik Esslinger It is certified that error appears in the above-identified patent and that said Letters Patent is hereby corrected as shown below:

<u>Title page,</u>
Please add Item [60], as follows:

-- [60]     Related U.S. Application Data

Provisional application No. 60/053,388, filed on July 22, 1997. --; and

<u>Column 1,</u>
In the line inserted between the "title" and "BACKGROUND OF THE INVENTION", please insert, between "filed Jul. 21, 1998" and the ".", the following:

-- , which claims priority from provisional application Ser. No. 60/053,388, filed Jul. 22, 1997 --

Signed and Sealed this

Fifteenth Day of April, 2003

JAMES E. ROGAN
*Director of the United States Patent and Trademark Office*